United States Patent [19]

Lefebvre

[11] 4,306,726

[45] Dec. 22, 1981

[54] FURNACE ELECTRODE SEAL ASSEMBLY

[75] Inventor: Jean J. Lefebvre, Tracy, Canada

[73] Assignee: Qit-Fer et Titane Inc., Sorel, Canada

[21] Appl. No.: 142,839

[22] Filed: Apr. 22, 1980

[51] Int. Cl.³ .......................... F16J 15/06; H05B 7/12

[52] U.S. Cl. ........................................ 277/12; 277/16; 277/22; 277/30; 277/116.4; 13/17; 13/32

[58] Field of Search ........................ 277/22, 12, 16, 30, 277/31, 116.4, 226, 116.6, 116.8; 13/14–17, 31, 32

[56] References Cited

U.S. PATENT DOCUMENTS

| | | | |
|---|---|---|---|
| 2,243,096 | 5/1941 | Hardin | 13/17 |
| 2,871,278 | 1/1959 | Sandvold | 13/17 |
| 3,709,506 | 1/1973 | Beerman | 277/12 |

FOREIGN PATENT DOCUMENTS

| | | | |
|---|---|---|---|
| 1040677 | 9/1966 | United Kingdom | 13/14 |

*Primary Examiner*—Robert S. Ward, Jr.
*Attorney, Agent, or Firm*—John L. Sniado; Walter Kruger

[57] ABSTRACT

An electric furnace electrode seal assembly includes a seal ring mounted on the furnace adjacent the electrode opening. The seal ring is stationary and supports a telescoping arrangement of a plurality of cylindrical water cooled sealing glands that extend upwardly along the electrode from the seal ring. The largest diameter gland can be located on top of the seal ring and the uppermost gland can be the smallest diameter and is supported by the electrode holder. Seals are interposed respectively between adjacent glands and these seals permit vertical telescopic movmeent as well as lateral movement of and slight tilting of the glands relative to each other. The bottom gland can slide on the seal ring to provide for additional lateral movement of the electrode and seal assembly. The assembly prevents leakage of gases and acts as a heat shield.

14 Claims, 6 Drawing Figures

FURNACE ELECTRODE SEAL ASSEMBLY

FIELD OF THE INVENTION

This invention relates to an improved seal assembly for an electric arc furnace of the type in which a large diameter electrode extends through an opening in the furnace to smelt or melt the contents of the furnace.

More particularly, the invention relates to a floating telescoping, liquid cooled electrode seal assembly for an electric furnace of the type in which the electrode is raised and lowered during operation of the furnace to maintain the electrode at a predetermined level relative to the charge or melt in the furnace.

BACKGROUND OF THE INVENTION

Electric furnaces are widely used for various metal smelting and refining operations. The typical furnace may include a plurality of carbon or graphite electrodes which extend through openings in the roof of the furnace to a location adjacent the level of the melt in the furnace. Typically, the furnace may include several 2-foot or greater diameter electrodes.

When molten material is tapped from the furnace, the level within the furnace lowers and it is necessary to lower the electrodes to follow the level of the melt in the furnace. Then, when additional charge is added to the furnace, the electrodes must be retracted to maintain them at the proper distance from the melt in the furnace. As the arc from the electrodes smelts or melts the furnace charge, the ends of the electrodes erode. Further, the massive electrodes are constantly lowered and lifted automatically by suitably controlled winches or other drive means to maintain proper operating conditions.

To avoid the escape of hot dust laden and frequently noxious gases with the corresponding environmental hazards and loss of heat and efficiency of the furnace, it is necessary to provide a good seal between each electrode and the furnace. Unless a reasonably gas tight seal is maintained, rapid erosion, and/or oxidation, including necking in of the electrode occurs along that length of the electrode which extends through the electrode opening in the furnace roof. Such erosion not only weakens the electrode, with the danger that the lower end of the electrode can break off, but also reduces the diameter of the electrode with the result that the current carrying capacity of the electrode is substantially reduced. In addition, the size of any opening between the electrode and the furnace increases as the electrode erodes which allows even more gas to escape. Tests show that typical temperatures of gases when flowing outwardly from a furnace through the annulus between the furnace opening and the electrode are on the order of 3,000° F., and hence, the electrode as well as surrounding structures and equipment can be damaged by the escaping hot gases.

Because of the large current carried by each electrode, the heat of the furnace and the vibration caused by the arc between the end of the electrode and the furnace melt, it is virtually impossible to provide a reliable close fitting seal without danger of damage to the electrode or the roof of the furnace through which the electrode extends. In addition, as a result of conditions within the furnace, the axis of the electrode may tilt slightly which presents further problems with a close fit of the electrode in the furnace opening. Further, there is no known seal material which can withstand the high temperatures at the electrode surface.

As previously explained, the electrodes are frequently lifted and lowered during operation of the furnace. When the electrode is lowered, it is also subjected to slag splashing from the furnace. If a close fitting opening or seal is provided at the furnace, slag on the outer surface of the electrode can damage the seal when the electrode is elevated.

While in many instances the pressure within the furnace is greater than atmospheric, there are times when below atmospheric pressure exists in the furnace. Such conditions may arise where especially noxious gases are emitted by operation of the furnace and such gases must be removed from the furnace by vacuum to avoid operator or worker hazards.

It is also desirable to maintain the region of the outside of the furnace near the electrode as cool as possible to avoid damage to electrode control and manipulating equipment, as well as to reduce hazards to the workers.

Consequently, there is a need for a reliable arc furnace electrode seal which seals under conditions of both positive and negative pressures in the furnace, which in no way interferes with adjustment or manipulation of the electrode, and which requires minimal maintenance. In accordance with this invention, such an electrode seal is provided.

THE PRIOR ART

In U.S. Pat. No. 3,709,506 an elongated seal is provided between a furnace electrode and a frusto conical shell, by packing a high temperature resistant flexible packing such as asbestos into the space between the shell and the surface of the electrode. While such an arrangement has worked reasonably well, it is difficult to maintain a wholly gas-tight seal because of the sliding movement of the electrode relative to the packing.

U.S. Pat. Nos. 2,243,096 and 2,871,278 each disclose seal arrangements with relatively movable sections, but in which the ultimate sealing to prevent passage of gases is effected by the presence of a liquid in one or more chambers of the seal. Where the liquid such as water is the primary seal medium, the permissible pressure for vacuuming the furnace is limited, and such seals present the danger of steam explosion if water from the seals enters the furnace.

SUMMARY OF THE INVENTION

The improved electric furnace seal of the present invention includes a lower seal ring assembly which extends radially outwardly of the furnace opening and has an inside diameter slightly greater than the diameter of the electrode. A telescoping seal assembly composed of a plurality of liquid cooled cylindrical glands extends around the electrode and suitable seals are disposed between the respective glands to permit axial movement relative to each other. The packing is flexible and spring biased to provide for axial movement of the electrode through the sections of the telescopic seal assembly and to compensate for wear of the packing. The telescopic seal assembly is so arranged relative to the lower seal ring that the telescopic assembly is free to slide radially on the seal ring and therefore the telescopic assembly is able to follow the normal lateral or transverse movement of the electrode. The lower seal ring and the upper telescopic assembly of preferably three glands are formed of metal, non-magnetic stainless steel being preferred in order to resist deterioration at the high temperatures encountered.

Preferably, both the lower seal ring and the upper telescopic assembly of three glands are water cooled to prevent deterioration at the high temperatures encountered. In addition, the seal ring can be seated on an additional water cooled seal ring which is stationary. The upper seal assembly seats on a seal surface of the lower seal ring which in turn seats on the seal surface of the next lower seal ring which is electrically insulated from the furnace. The upper seal assembly is mounted on the seal ring for transverse movement, but against upward movement.

The upper seal assembly as heretofore referred to comprises preferably three concentric and telescoping gland members. The larger diameter gland is attached to the lower or first seal ring with the gland of intermediate diameter interposed between the larger diameter gland and the upper small diameter gland which attaches to the electrode holder. Each gland is double-walled and includes a unique arrangement of baffle plates therein which function to direct the cooling water through the gland to attain uniform cooling. Each gland has independent inlets and outlets for the cooling water and these inlets and outlets are located at the upper portion of the gland at least with respect to the upper two glands.

An annular slot is provided at the upper end of each of the lower two glands of the telescopic assembly and received in each slot is an asbestos rope seal. The seal is in the shape of an annular ring and seats in the slot in surrounding relationship to the outside surface of the adjacent water cooled gland. The seal or packing is therefor sealing against a cold water jacket and is itself mounted at the upper end of a water gland and is not exposed to direct radiation from the furnace. In order to increase the degree of sealing provided by these seals, there is arranged about the periphery of these seals a spring which tends to force the seals radially inwardly while allowing outward radial expansion.

The annular slot in the glands for receiving the asbestos seal is radially enlarged so that each seal and its spring can move radially in the slot. By virtue of this arrangement, each such seal can slide in its slot to a limited extent thereby providing for limited radial movement between the several glands of the telescoping assembly. Advantageously, each such slot is at the end of a gland and is closed by an end plate comprised of two diametrically split sections so that the seal is readily exposed for maintenance by removing this end or cover plate.

Each gland has a diameter greater than the diameter of the electrode so that even the smallest gland has its inside surface spaced from the outside surface of the electrode. In the preferred embodiment where the upper gland is the smallest diameter gland, the spacing between the outside surface of the electrode and the inside surface of the gland is advantageously greater than about 1", so that the gland does not directly contact the electrode, yet assists in maintaining the upper portion of the electrode cooled by virtue of the gland itself being water cooled.

Advantageously, the upper gland is supported by the electrode holder via the electrode shoe clamp and a bracket arrangement which thus suspends the upper gland. To seal the upper gland relative to the electrode, an axially compressible seal is provided between the upper end of the upper gland and a lower face of the electrode shoe. By virtue of this arrangement and the suspension bracket, the seal can readily be compressed axially to the required extent by simply tightening nuts on screws of the suspension bracket to lift the gland upwardly toward the shoe.

The several glands are each continuous cylinders which are assembled by sliding them into the next adjacent gland. It is necessary, however, for the upper gland to lift the lower gland during telescoping of the glands and for this purpose inter-engaging lugs are provided between the bottom of the upper gland and the top of the intermediate gland. These lugs are so arranged that the two glands can be rotated to a position in which the lugs clear each other and after one gland is inserted into the other, it is again rotated to a position in which the lugs overlap so that axial separation of the glands is prevented and the upper gland lifts the lower gland when the respective lugs engage. To prevent the glands from again rotating to a position in which they can axially separate, means are provided to prevent rotation of the glands relative to each other.

Accordingly, it is an object of the present invention to provide an improvement in electric arc furnaces wherein a large diameter electrode extends through an opening in the furnace, the improvement being a unique telescoping electrode seal assembly.

Another object of the present invention is a unique seal for the electrode of an electric furnace wherein a telescopic assembly is provided including at least two and preferably three concentric gland members, although more can be used, each of which is water cooled and contains a series of circumferential baffles to increase the path of travel of cooling water therethrough.

A further object of the present invention is to provide an annular packing for each of the telescopic glands of the seal and wherein that packing includes a spring biasing means to force the packing radially inwardly yet to allow the packing to expand outwardly if need be.

Another object is to provide a water cooled seat for the packing and wherein the packing engages the cooled outer surface of the adjacent gland which also shields the packing from furnace radiation.

A still further object of the present invention is to provide in a telescopic seal for an electric furnace a series of stop members in each of the glands of the telescopic assembly, which stop members prevent the three or more glands of the assembly from pulling apart axially of the electrode which they surround.

Yet another object and feature of the present invention is to include in the telescopic gland assembly at least one locking bar attached between the upper ends of both the lower gland and the intermediate gland for the purpose of preventing the rotation of the intermediate gland relative to the adjacent glands.

An additional object is a telescoping furnace electrode seal assembly in which the telescoping glands can also move laterally relative to each other to compensate for vibration of the electrode.

These and other features, advantages and objects of the invention will become apparent with reference to the drawings and to the detailed description which follows:

IN THE DRAWINGS

DETAILED DESCRIPTION

Figure 1:
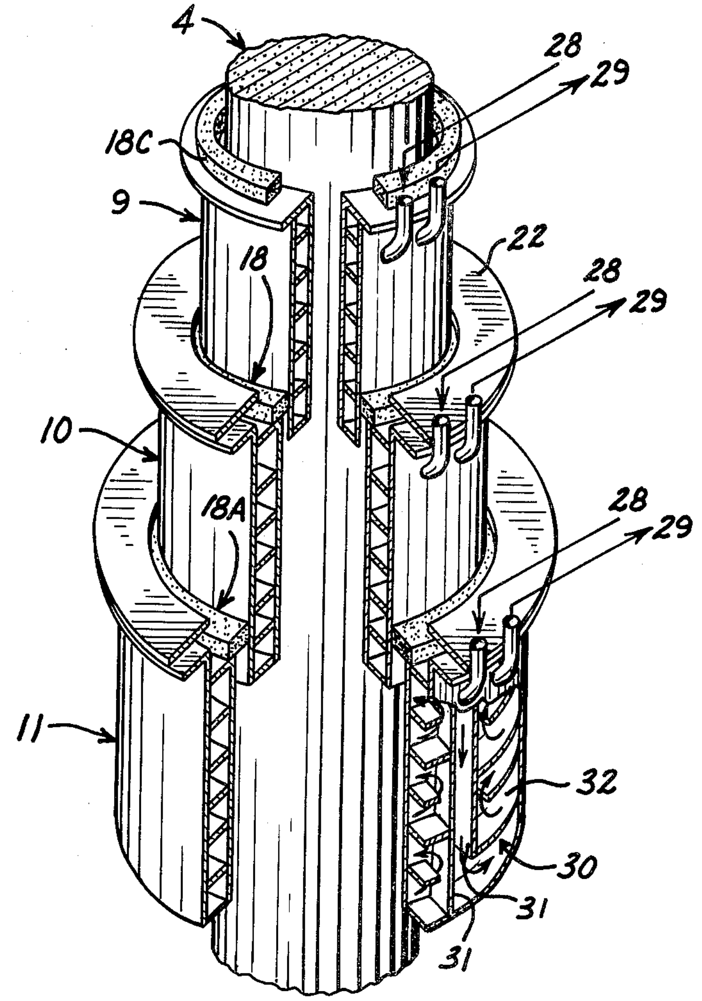
FIG. 1 is a pictorial view with portions cut away showing an electrode with the telescopic seal of this invention mounted thereon.
Figure 2:
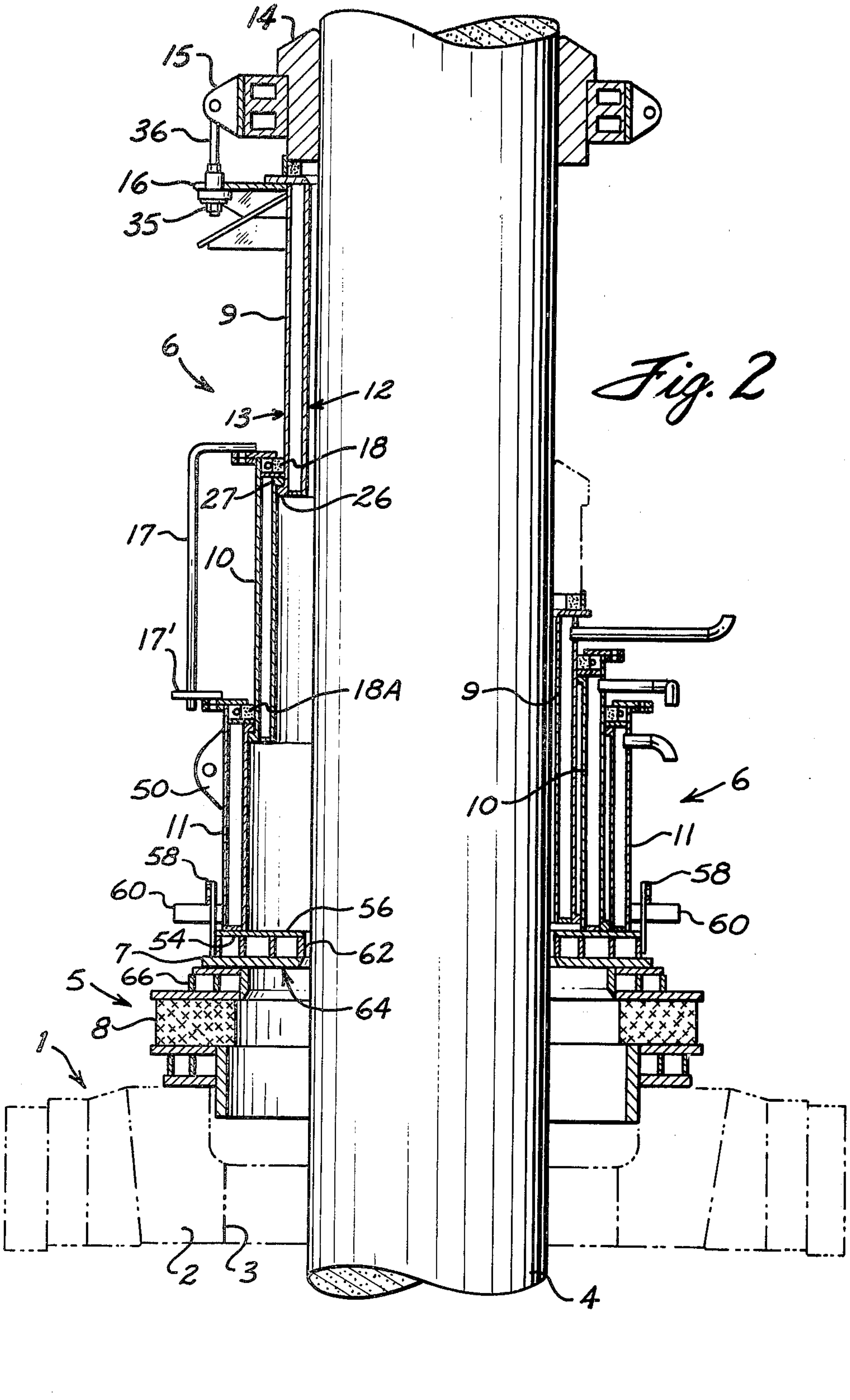
FIG. 2 is a front view in elevation and partly in section showing the seal assembly extended on one side and retracted on the other side and also showing a portion of the furnace roof through which the electrode extends.

As shown in FIGS. 1 and 2, there is an electrode surrounded by a telescoping gland assembly.

With reference to FIG. 2, there will be seen a furnace roof 1 comprise of a refractory material including brick work 2 defining a circular opening 3 through which an electrode 4 extends from a location outside of the furnace. Supported at the upper end of opening 3 and seated on the brick work 2 adjacent the opening 3 is a stationary seal assembly 5 which extends around the electrode 4 and is concentric with the axis of the opening 3. Seated on the stationary seal assembly 5 is a telescopic and laterally movable seal assembly 6. Seal assembly 5 includes a laterally movable liquid cooled seal ring 7 which slides on a stationary water cooled seal ring which seats on an insulating support ring 8 which can seat on another water cooled ring.

The improvement of the present invention resides in the movable assembly 6 and its sealing of the electrode relative to the furnace. This assembly 6 comprises a plurality of preferably three telescoping gland members 9–11 each of which includes an inner wall 12 and an outer wall 13. Each of the glands 9–11 is of cylindrical shape and hollow to be received around electrode 4 and these glands 9–11 are nested one with respect to the other in telescopic fashion. Upper gland 9 is of the smallest diameter and telescopes within gland 10 which is of intermediate diameter. The lower gland 11 is of larger diameter then the intermediate gland 10 which telescopes within gland 11.

An electrode shoe 14 is clamped to the upper end of electrode 4 and includes an electrode holder or clamp 15 which is attached to the upper gland 9 by means of arms 16. It should be apparent that when the electrode 4 is moved upwardly, the glands 9–11 extend axially with it from their position as seen on the right side of FIG. 2 to their extended position as seen on the left side of FIG. 2. Lowering of electrode 4 again nests and telescopes the glands 9–11. Because of electrode movement, vibration and magnetic fields, there is a tendency for the intermediate gland 10 to revolve about the axis of the electrode 4, and therefore to prevent this and stabilize the telescopic seal system 9–11, there is provided a locking rod 17 which is attached to the upper end of gland 10 and projects downwardly between parallel spaced apart guide bars 17′ through which the rod can slide.

Figure 5:
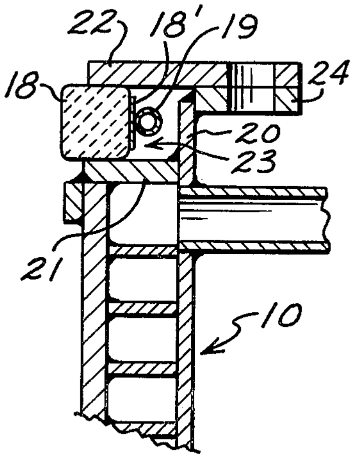
FIG. 5 is an enlarged view in axial section of an intermediate gland.

With reference now to FIG. 5, each of the glands 10 and 11 include at their upper end a packing or seal element 18 which comprises asbestos rope encircled by a flat strap 18′ and a spring 19. The effect of spring 19 is to compress the seal 18 inwardly to produce a good seal against the outer surface of the adjacent inner gland but which allows the seal to expand. From FIGS. 2 and 5, it is to be noted that seal 18 is mounted at the upper end of gland 10 and contacts the outer surface of gland 9. Seal 18A, on the other hand, is at the upper end of gland 11 and surrounds and contacts the outer surface of gland 10. In each case, the springs 19 force the seals 18 and 18A inwardly to prevent leakage between glands 9–11.

With reference again to FIG. 5, plates 20 and 21 form a seat for receiving both the seal 18 and the back-up strap and spring 19. A diametrically split ring 22 defines an annular slot in which the seal is located. Ring 22 can be easily removed in order to service seal 18 or spring 19. Flange 24 on plate 20 provides for securing the halves of ring 22 to the gland. The strap 18′ which extends around the outer periphery of the packing distributes the radially inward force of the spring 19 along the outside of the packing. The packing 18 is of a height to be a close sliding fit between plates 21 and 22. Further, it will be noted that the annular slot 23 is radially larger than the spring and seal so that the seal can move radially to a limited extent permitting limited radial movement between adjacent glands.

Figure 4:
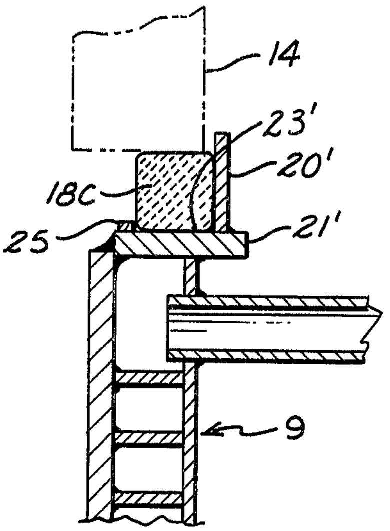
FIG. 4 is a partial view in axial section of the upper gland of the assembly showing its packing receiving region.

FIG. 4 shows the upper end of the upper gland 9 and its seal support. Spaced apart at 40° intervals on plate 21′ are locating lugs 20′ in the form of short upright plates. Seal 18C seats on the flat top surface 23′ of top plate 21′. Spaced outwardly of the inner edge of plate 21′ is a ring 25 of short axial extent relative to the gland and which spaces seal 18C from the inside surface of the gland.

With reference to FIG. 2, it is believed evident that tightening the bolts 35 of the mounting bracket 15 lifts gland 9 upwardly so that seal 18C is compressed axially between the top surface 23′ of plate 21′ and the bottom surface of the shoe assembly 14. Further, it will be noted that the threaded studs 36 are pivotally connected to permit centering gland 9 relative to the shoe assembly. The lugs 20′ are diametrically spaced slightly greater than the shoe assembly to assure that the gland is centered with respect to the shoe and correspondingly with respect to the electrode.

It will be noticed, with reference to FIG. 2, that the inside surface of gland 9 is spaced from the outside surface of electrode 4, when the gland is mounted on the electrode by the mounting bracket 15. This arrangement avoids any direct contact between the hot outside surface of the electrode and the inside of the gland, and by virtue of the liquid cooling of the gland, preferably with cool water, the portion of the electrode surrounded by gland 9 is cooled to a certain extent.

Figure 3:
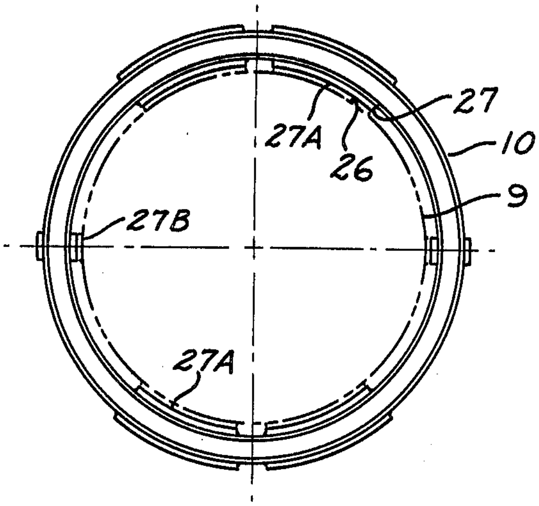
FIG. 3 is a view in plan of the intermediate gland showing the arrangement of stop members or lugs for preventing axial disengagement of the glands.

Each of the glands 9–11 is fabricated, for example, by welding, to form a hollow circular shell. The outside wall of the glands 9 and 10 presents a smooth surface for good sealing of the respective seals 18 and 18A. The glands are first separately fabricated and are then assembled in the telescopic form shown at FIG. 2. As is believed evident, as gland 9 is drawn upwardly, an array of lugs 26 on its outer surface, and near its lower end, engages an array of lugs 27 on the inner surface of gland 10 near its upper end. After these lugs engage, gland 10 is lifted upwardly by gland 9, and there is then relative movement between glands 10 and 11. The lugs 26 and 27 are connected to the respective glands 9 and 10 in the array shown at FIG. 3. The circumferential extent of the several sections 27A and 27B of these lugs is less than 180° to permit assembling gland 9 to gland 10 by first rotating the gland 9 90° from its working position, inserting the lower end of gland 9 into gland 10 until the lugs 26 on gland 9 are beneath lugs 27 of gland 10, and then rotating the gland 9 90° so that corresponding segments of the lugs are axially opposed to each other. Such assembly is permitted by the spacing of the lugs circumferentially as shown in FIG. 3.

A similar arrangement of lugs is provided between glands 10 and 11 to prevent axial separation of these glands. It will of course be appreciated that gland 10 could be lifted by other suitable supports when the gland 9 is withdrawn to a position close to the upper end of gland 10.

After the glands are assembled one within the other, guide bars 17′ are welded in position with rod 17 extending through this guide arrangement to prevent rotation of intermediate gland 10.

Figure 6:
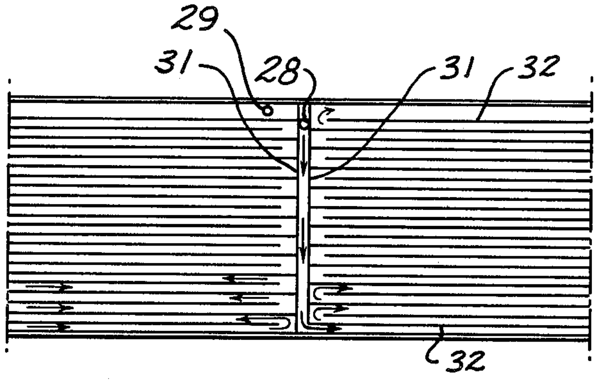
FIG. 6 shows the lay-out in plan of the cooling passage baffle arrangement of the glands.

As shown in FIGS. 1 and 6 each gland is water cooled with cooling water fed through its inlet pipe 28, and which exits from the gland through the outlet pipe 29. Suitable flexible hoses (not shown) are connected to the inlet and outlet pipes 28, 29 to provide forced circulation of the liquid coolant.

To provide more effective and uniform cooling, each gland has between its inner and outer walls 12 and 13, an arrangement of baffles 30 which direct the flow of cooling water between inlet 28 and outlet 29. A pair of vertical baffles 31 direct water from inlet 28 to the bottom of the gland, and staggered circumferential baffles 32 cause the water to flow circumferentially, upwardly, and then circumferentially in the opposite direction until the water ultimately reaches outlet 29. This provides excellent and efficient cooling in each gland.

As shown in FIG. 2, a handling lug 50 in the form of an ear having an opening therein is secured to the outside of gland 11. There are four such lugs on the outside of gland 11 spaced equally from each other, and circumferentially offset from the stop bar 17 and the inlet and outlet pipe of each gland. Further, an inverted U-shaped bracket 58 is connected at spaced apart circumferential locations on the seal ring 7, the opening in the bracket receiving arms 60 secured to and projecting outwardly from gland 11 near its bottom. The lugs 60 and openings in brackets 58 permit some lateral and circumferential movement of gland 11 with respect to seal ring 7.

With reference to FIG. 2, it will be noted that the opening 62 in seal ring 7 is only slightly greater than the diameter of the electrode 4 and correspondingly, provides a water cooled shield to block some radiation from the inside of the furnace. The bottom surface 64 of ring 7 is preferably slidable on the top surface of the water cooled ring 66. This provides for further lateral movement of the telescoping seal assembly and the electrode. It will further be noted from FIG. 2, that when the electrode is lowered to the point where the telescoping gland sections are in the position shown at the right hand side of FIG. 2, further sealing is attained between the bottom surfaces of the glands 9 and 10, and the top surface of the seal ring 7. More significant, as the glands 9 and 10 telescope within gland 11, these glands shield the inside surface of the gland 11 which facilitates cooling this gland which is normally the one which receives the most heat from the furnace and the electrode.

During operation of the furnace, it is necessary to continually adjust the electrode vertically to maintain proper operating conditions in the furnace, by correspondingly adjusting the length of the arc between the end of the electrode and the melt in the furnace. Further, the bottom of the electrode erodes, which requires moving the electrode downwardly to maintain the required arc length. The telescopic seal assembly 6 permits all such movement as well as lateral movement of the electrode when required, yet maintains an effective seal between the inside and outside of the furnace. Further, the packing or seals 18, and 18A, tend to absorb some of the vibration of the electrode.

Where each of the glands shown in FIGS. 1 and 2 is approximately 2′ high, the arrangement shown permits vertical movement of the electrode by a distance of over 3′, without the need for adjusting the electrode relative to the shoe 14. This has been found to be sufficient vertical movement during normal operation.

The seal arrangement shown and described can withstand pressures substantially greater than those usually encountered during operation of the furnace. Further, good sealing is attained even if the pressure in the furnace is lowered to below atmospheric pressure, so that a negative pressure can be maintained in the furnace if desired.

By virtue of the construction shown and described, the several seals are easy to install and replace, and the assembly itself is reliable and long lasting, thereby reducing to a minimum the required maintenance for the seal arrangement.

It will be apparent from the foregoing that many other variations and modifications may be made in the structures and methods described herein without departing substantially from the essential concept of the present invention. Accordingly, it should be clearly understood that the forms of the invention described herein and depicted in the accompanying drawings are exemplary only and are not intended as limitations in the scope of the present invention.

What is claimed is:

1. In an electric furnace of the type in which an electrode extends through an opening in the furnace, an electrode seal assembly to seal the electrode relative to the furnace, said seal assembly comprising:

- a plurality of different diameter axially telescopically slidable fluid cooled glands surrounding said electrode, said plurality of glands including a lower gland and an upper gland;
- slidable mechanical seal means between said upper gland and said lower gland for sealing between said glands during relative axial movement, said seal means comprising a circumferential seal carried by an outer gland and sealing against an exterior surface of an adjacent inner gland;
- means connecting said upper gland to said electrode for movement with the electrode;
- seal means for sealing said upper gland with respect to said electrode; and
- means sealing said lower gland relative to said furnace opening for lateral movement relative to said opening.

2. A furnace electrode seal assembly according to claim 1, wherein said plurality of glands further comprises, at least one intermediate gland between said upper gland and said lower gland, said intermediate gland having an exterior seal surface engaged by a seal of an adjacent outer gland, and a circumferential seal engaging an exterior seal surface of an adjacent inner gland.

3. A furnace electrode seal assembly according to claim 1 wherein each of said glands comprises a hollow annular body, and inlet and outlet cooling fluid pipes connected to each gland.

4. A furnace electrode seal assembly according to claim 3, wherein each gland contains therein baffle means for directing cooling liquid along a tortuous path within the gland between said inlet and outlet pipes.

5. A furnace electrode seal assembly according to claim 2, wherein said circumferential seals each comprise a seal ring of relatively high temperature resistant material and means for urging said rings into tight sealing engagement against exterior surfaces of said glands.

6. A furnace electrode seal assembly according to claim 5, further comprising means mounting said seal rings for limited radial movement so that said glands can move laterally relative to each other during lifting and lowering of the electrode.

7. A furnace seal assembly according to claim 2, further comprising means for preventing rotation of said intermediate gland relative to said upper and lower glands.

8. A furnace seal assembly according to claim 1, wherein an electrode shoe extends around said electrode at a location above said upper gland;

said means connecting said upper gland to said electrode comprises means suspending said upper gland from a holder of said electrode shoe; and said sealing means for sealing said upper gland with respect to said electrode comprises a seal ring between said upper gland and said electrode shoe.

9. A furnace seal assembly according to claim 7, wherein said seal ring is axially compressed between said shoe and a transverse face of said upper gland.

10. A furnace seal assembly according to claim 2, wherein said means for lifting said intermediate gland during upward movement of said electrode comprises lugs adjacent the lower end of said upper gland and lugs adjacent the upper end of said intermediate gland, said lugs abutting each other to lift said intermediate gland prior to axial separation of the upper gland from the intermediate gland.

11. A furnace seal assembly according to claim 10, wherein said lugs comprise lugs extending along less than 180° of opposed surfaces of said upper gland and intermediate gland, said lugs being spaced apart circumferentially to enable telescopically joining said glands by insertion of one gland into the other and connecting said glands against withdrawal by relative rotation therebetween.

12. A furnace seal assembly according to claim 1, wherein said means sealing said lower gland relative to said furnace opening for lateral movement comprises a bottom face of said lower gland seated on the top face of a ring surrounding the furnace opening, and means connecting said gland to said ring for limited lateral sliding movement of the bottom surface of the gland on the ring.

13. A furnace seal assembly according to claim 12, wherein said ring comprises a liquid cooled ring sealed with respect to the furnace opening and insulating material means between said ring and the furnace.

14. A furnace seal assembly according to claim 1, wherein said glands are of successively increasing diameter from said upper gland to said lower gland so that, as said electrode is lowered, inner surfaces of said intermediate gland and upper gland shield the interior of the lower gland.

* * * * *